United States Patent [19]

Culaud

[11] 4,331,173
[45] May 25, 1982

[54] HYDRAULIC SYSTEM FOR FEEDING AN ACTION TURBINE

[75] Inventor: André Culaud, Geneva, Switzerland

[73] Assignee: Ateliers des Charmilles S.A., Geneva, Switzerland

[21] Appl. No.: 129,386

[22] Filed: Mar. 11, 1980

[30] Foreign Application Priority Data

Mar. 29, 1979 [CH] Switzerland ............... 2898/79

[51] Int. Cl.³ ............................................. F16K 43/00
[52] U.S. Cl. ..................................... 137/219; 239/583; 239/600
[58] Field of Search .......................... 137/219, 614.18; 251/211; 239/390, 397, 600, 583

[56] References Cited

FOREIGN PATENT DOCUMENTS 656042 1/1963 Canada ..................... 137/219
1140150 11/1962 Fed. Rep. of Germany ...... 137/219

Primary Examiner—Gerald A. Michalsky
Attorney, Agent, or Firm—Emory L. Groff, Jr.

[57] ABSTRACT

A hydraulic system for feeding an action turbine comprising a rectilinear gate and an injector mounted in series on a conduit through which water is supplied to the turbine wherein the gate has a shut-off which is mounted in an outer body member for the injector, said shut-off having a seat member associated therewith, the injector including a needle valve which has a seat member associated therewith, said seats being located adjacent one another. The needle valve may have a support associated therewith and the shut-off for the gate may be located upstream thereof. The needle valve seat may be displaceable downstream to permit closing of the gate. In such position, the needle vale and its seat may be disassembled without emptying the water supply conduit.

5 Claims, 3 Drawing Figures

HYDRAULIC SYSTEM FOR FEEDING AN ACTION TURBINE The present invention relates to a hydraulic injector system for feeding an action turbine, more particularly a Pelton wheel turbine.

A hydraulic injector system for feeding an action turbine is already known which comprises a rectilinear gate and an injector. The gate and the injector are mounted in series on a water supply conduit provided with two servo-motors. These motors control the gate shut-off and the needle valve of the injector, such a gate-injector system is of reduced size compared with most other known injectors and includes a gate permitting the removal and the replacement of the parts of the injector which have worn without necessitating the emptying of the water supply conduit to the turbine.

The present invention seeks to provide a gate-injector of this type but in which the size, the weight, and the cost thereof are still further reduced whilst simultaneously facilitating inspection, removal and replacement of worn parts.

According to the present invention, there is provided a hydraulic system for feeding an action turbine comprising a rectilinear gate and an injector mounted in series on a conduit through which water is supplied to the turbine wherein the gate has a shut-off which is mounted in an outer body member for the injector, said shut-off having a seat member associated therewith, the injector including a needle valve which has a seat member associated therewith, said seats being located adjacent one another.

The invention will be further described by way of example, with reference to the accompanying drawings, in which.

Figure 1:
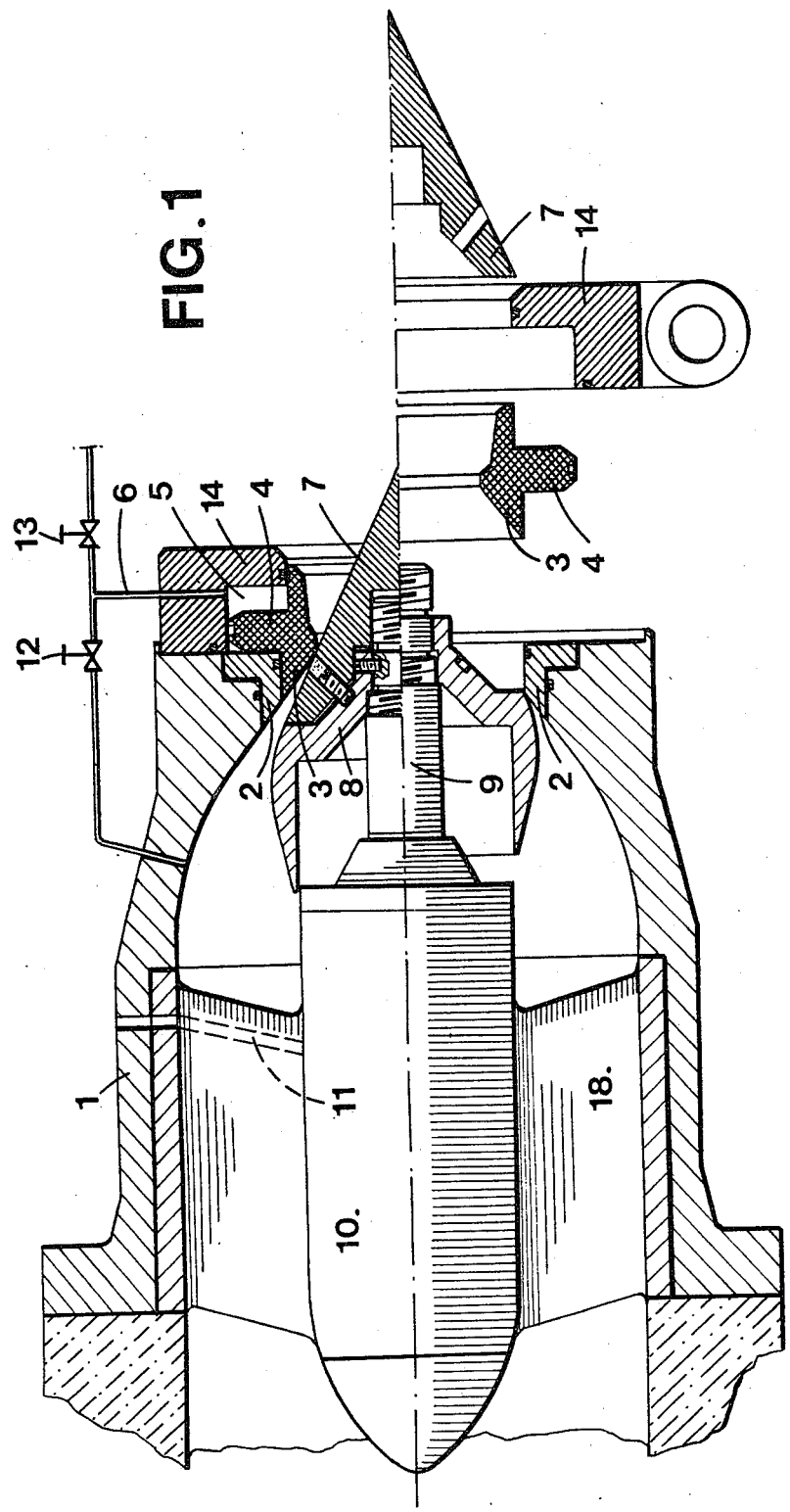
FIG. 1 is an axial section view of a hydraulic system in accordance with the present invention.

The system shown in FIG. 1 is mounted on the end of the water supply conduit to a Pelton wheel turbine (not shown). The system comprises an outer body 1 in which a gate seat 2 and a needle valve seat 3 are mounted in a juxtaposed manner. The seat 3 of the needle valve has a peripheral rib 4 which, in use, is located in a groove 5 having a width greater than that of rib 4. The downstream end of the groove 5 communicates by means of a conduit 6 with the interior of the body 1 of the injector system. The needle valve seat 3 is maintained in its operative position by the pressure of water flowing in the conduit 6. A needle valve 7 is mounted on a support 8 which is disposed around the longitudinal axis of the body 1. The support 8 is, in turn, mounted on the rod 9 of a servo-motor 10, which latter is maintained co-axial with the body 1 by means of a support 18. The motor is fed with oil through a supply conduit 11.

The contents of the conduit 6 can be exhausted by closing the gate 12 and opening the gate 13. If the contents of the oil conduit 11 and the water conduit 6 are simultaneously exhausted, the needle valve seat 3 is displaced towards the right as shown in FIG. 1. The support 8, which also constitutes the shut-off of the gate, is also displaced and bears against the gate seat 2 as can be seen in the lower half of FIG. 1. It is then easy to remove the end piece 14 of the injector which, together with the outer body 1, defines the groove 5 in which the rib 4 of the needle valve seat 3 of the injector and the needle valve 7 itself, are located without the necessity of emptying the water supply conduit on which the outer body 1 is mounted.

Figure 2:
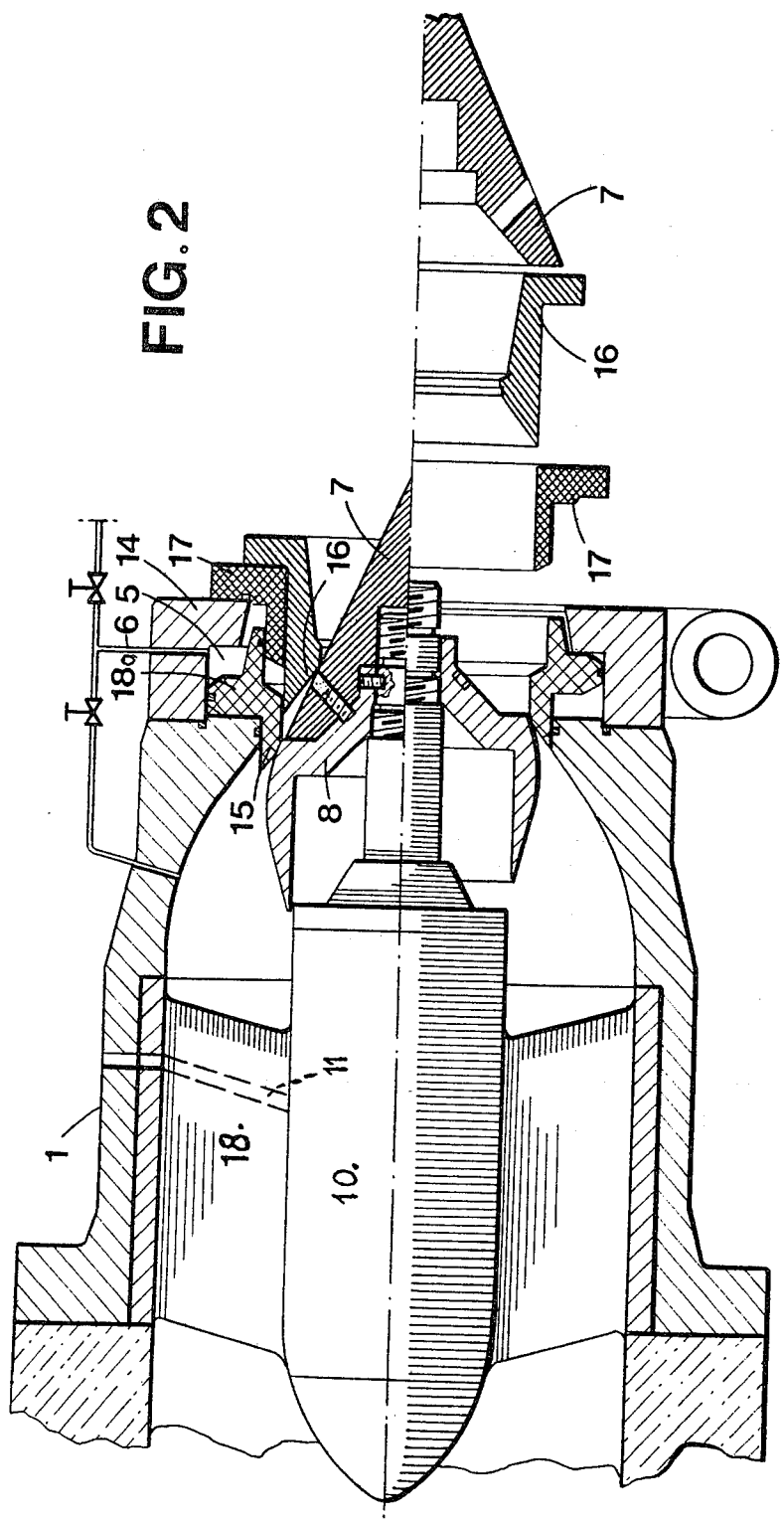
FIG. 2 is a view similar to FIG. 1 of a modified system.

In the embodiment shown in FIG. 2, a movable gate seat 15 is provided which has a peripheral rib 18a engaging in the groove 5 defined by the end piece 14 of the injector. The needle valve seat 16 of the injector is fixed. When the groove 5 is connected to the upstream chamber defined by the outer body 1 through the conduit 6, the movable gate seat 15 pushes the support 8 for the needle valve 7 of the injector towards the left as shown in FIG. 2. This permits the disconnection of the needle valve seat 16 of the injector. After exhausting of the conduit 6, the part 17 and the needle valve 7 can likewise be demounted without emptying the water supply conduit on which the outer body 1 is mounted. This is effected by displacing the gate valve seat 15 to the right as shown in FIG. 2 so that it bears against the part 14 (see the lower half of FIG. 2).

Figure 3:
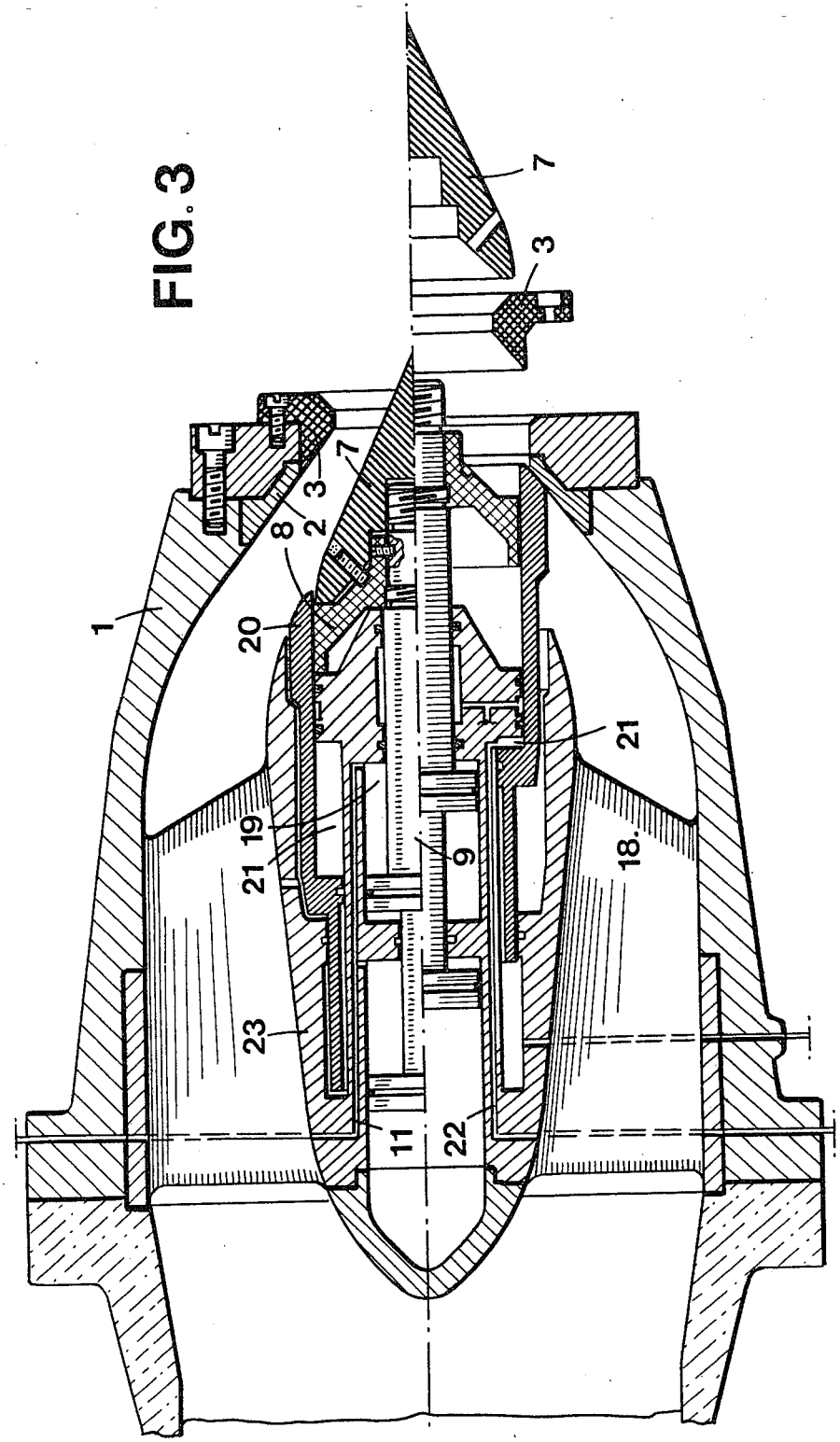
FIG. 3 is a view also similar to FIG. 1 of a further modified system.

In the embodiment shown in FIG. 3, the seat 2 for the shut-off member 20 of the gate and the seat 3 for the needle valve 7 of the injector are both fixed. The shut-off member 20 of the gate is formed by a cylindrical sleeve co-axially mounted around the support 8 for the needle valve 7 and of the servo-motor 19 for the valve 7. The servo-motor 21 for the shut-off of the gate 20 is disposed in an inner body member 23 of the injector, co-axially around the servo-motor 19 for the needle valve 7 of the injector. The servo-motor 21 is fed with oil through a conduit 22, whilst the servo-motor 19 for the needle valve 7 is fed with oil through the conduit 11. The sleeve 20 is displaced, as shown in FIG. 3, towards the right under the effect of water pressure when the conduit 22 for the servo-motor 21 is exhausted. The sleeve 20 then bears against the seat of the gate 2. It is then easy to remove the needle valve 7 of the injector and the seat 3 therefor without the necessity of emptying the water supply conduit on which the outer body 1 is mounted. Relative to the embodiments shown in FIGS. 1 and 2, this embodiment has the advantage of permitting the cutting-off of all of the outflow of water by closing the gate-sleeve 20, 2, irrespective of the position of the needle valve 7.

In the embodiment described, it is not necessary to balance the pressures between the interior of the injector body and of the gate body whilst the gate is being opened. This was necessary hitherto and was effected by using a by-pass conduit. The present invention precludes the possibility of vibration occurring during such balancing of the pressures. In fact, the quantity of water admitted between the needle valve in its closed position and the gate, during the opening of the gate is negligible.

Moreover, the protection gate usually mounted in front of each injector can be dispensed with, which reduces the load losses.

Such a system is particularly well suited to be mounted on the distributor of hydraulic machines which comprise a Pelton turbine and a pump, and particularly permits the dimensions of the distributor to be reduced.

I claim:

1. A hydraulic system for feeding an action turbine comprising a rectilinear gate and an injector mounted in series at the end of a conduit through which water is supplied to the turbine, an outer body member in which said gate and injector are mounted, said gate including shut-off means mounted in said body member, said shut-off means including a gate seat and a support in said body member, a needle valve mounted on the end of said support, a needle valve seat adjacent said gate seat, said support disposed upstream of said needle valve, and pressure controlled hydraulic means for displacing said support, said needle valve and said needle valve seat in an axial direction to close said gate when said support bears against said gate seat.

2. A system as claimed in claim 1 wherein said gate and said injector are located adjacent one another, said injector having a conical mouth portion, said gate shut-off means located adjacent said needle valve seat and said gate seat located in the conical mouth portion of the injector.

3. A system as claimed in claim 1 wherein when said gate is closed, said needle valve and said needle valve seat member can be disassembled from the system.

4. A system as claimed in claim 1 wherein said needle valve seat is displaced in an up-stream direction in the open position of said injector, the shut-off means being in an open position.

5. A system as claimed in claim 4, wherein said needle valve seat is maintained in its position permitting the injector to function by the pressure of water located in the water supply conduit.

* * * * *